United States Patent
Wagner et al.

(10) Patent No.: US 7,788,126 B2
(45) Date of Patent: Aug. 31, 2010

(54) REAL-TIME COLLABORATION AND WORKFLOW MANAGEMENT FOR A MARKETING CAMPAIGN

(75) Inventors: Todd R. Wagner, Shorewood, MN (US); Robert W. Plourde, Woodbury, MN (US); J. Patrick O'Halloran, Hopkins, MN (US); George R. Corugedo, Wayland, MA (US); Chuck Tyner, Hazel Crest, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

(21) Appl. No.: 11/543,660

(22) Filed: Oct. 5, 2006

(65) Prior Publication Data

US 2007/0083417 A1  Apr. 12, 2007

Related U.S. Application Data

(63) Continuation of application No. 10/840,396, filed on May 6, 2004, now abandoned, which is a continuation of application No. 10/014,840, filed on Oct. 22, 2001, now abandoned.

(51) Int. Cl.
  *G06F 17/30* (2006.01)
(52) U.S. Cl. ............................................. 705/10; 705/1
(58) Field of Classification Search ...................... 705/7, 705/10
  See application file for complete search history.

(56) References Cited

U.S. PATENT DOCUMENTS

| | | | |
|---|---|---|---|
| 5,548,506 A | 8/1996 | Srinivasan | |
| 5,659,724 A | 8/1997 | Borgida et al. | |
| 5,812,134 A | 9/1998 | Pooser et al. | |
| 5,987,466 A | 11/1999 | Greer et al. | |
| 6,064,977 A | 5/2000 | Haverstock et al. | |
| 6,073,109 A * | 6/2000 | Flores et al. | 705/8 |
| 6,088,679 A * | 7/2000 | Barkley | 705/8 |
| 6,157,915 A * | 12/2000 | Bhaskaran et al. | 705/7 |
| 6,219,680 B1 | 4/2001 | Bernardo et al. | |

(Continued)

FOREIGN PATENT DOCUMENTS

WO  WO-99/54828 A1  10/1999

(Continued)

OTHER PUBLICATIONS

"IBM bares e-commerce software iSeries". BusinessWorld. Manila: Jun. 5, 2001. p. 1.*

(Continued)

*Primary Examiner*—Johnna Loftis
(74) *Attorney, Agent, or Firm*—Fish & Richardson P.C.

(57) ABSTRACT

A system for enabling real-time collaboration and workflow management of a marketing campaign within a marketing organization is disclosed. In one aspect, user displays for the marketing organization's computer system are provided. A role portal component provides at least two respective role portals that correspond to at least two marketing roles within the marketing organization (for example, marketing executive, marketing manager, data analyst, etc.). A workbench component generates, on a user display, a workbench that corresponds to each of the role portals. Each workbench permits a user to access metric and workflow information associated with the corresponding marketing role. The workbench for each role may comprise several displayable webpages, such as a home page, an activities page workflow, a marketing campaigns with information and metrics about various marketing campaigns, and a customer analysis page.

16 Claims, 14 Drawing Sheets

U.S. PATENT DOCUMENTS

| | | | |
|---|---|---|---|
| 6,223,177 | B1 | 4/2001 | Tatham et al. |
| 6,226,745 | B1 * | 5/2001 | Wiederhold .................... 726/1 |
| 6,240,444 | B1 | 5/2001 | Fin et al. |
| 6,253,234 | B1 | 6/2001 | Hunt et al. |
| 6,334,110 | B1 * | 12/2001 | Walter et al. ............. 705/14.41 |
| 6,381,640 | B1 * | 4/2002 | Beck et al. ................. 709/223 |
| 6,539,404 | B1 * | 3/2003 | Ouchi ........................ 715/205 |
| 6,643,652 | B2 * | 11/2003 | Helgeson et al. .............. 707/10 |
| 6,748,420 | B1 * | 6/2004 | Quatrano et al. ........... 709/205 |
| 6,904,449 | B1 * | 6/2005 | Quinones ................... 709/203 |
| 6,990,513 | B2 * | 1/2006 | Belfiore et al. ............. 709/203 |
| 2002/0065722 | A1 * | 5/2002 | Hubbard et al. ............... 705/14 |
| 2002/0099679 | A1 * | 7/2002 | Usitalo et al. ................ 706/46 |
| 2003/0033192 | A1 * | 2/2003 | Zyman et al. ................ 705/10 |

OTHER PUBLICATIONS

"Primix Unveils Sales and Marketing Portal Offering; Solution Delivers Fast and Efficient Access to Information to Close Deals Faster and Increase Revenue".*

Information regarding Enterprise Insight downloaded from www.epiphany.com, May 18, 2001.

Information regarding nQuire Software downloaded from www.nQuire.com, Jul. 23.

MarketFirst Announces Initial Customer availability of MarketFirst 2.0. PR Newswire p252526, May 4, 1999, PR Newswire [Retrieved Jun. 25, 2005 from PROQUEST ID:4107900] (3 pages).

Karpinski, Ad sales go real-time, Dec. 1, 1997, InternetWeek, v.692, p. 19 [Retrieved Jun. 24, 2005 from EBSCOhost AN:177303] (2 pages).

Anonymous, Paragren Technologies and Rubric announce strategic relationship,, Jul. 30, 1998, PR Newswire—NY [Retrieved Jun. 27, 2005 from PROQUEST ID:32474280] (2 pages).

* cited by examiner

REAL-TIME COLLABORATION AND WORKFLOW MANAGEMENT FOR A MARKETING CAMPAIGN

RELATED APPLICATIONS

Under 35 USC 120, this application is a continuation of U.S. patent application Ser. No. 10/840,396, filed on May 6, 2004 now abandoned which is a continuation of and claims priority to U.S. patent application Ser. No. 10/014,840, filed on Oct. 22, 2001 now abandoned.

TECHNICAL FIELD

The invention relates to computer-based, real-time collaboration and workflow management of marketing campaigns within a marketing organization.

BACKGROUND

Intense global competition, emerging technology, incredible reservoirs of marketing and customer data, less loyal but more sophisticated customers demanding personalized, permission-based attention and service, and a growing corporate emphasis on customer relationship management (CRM) have given organizations the imperative to do marketing faster, cheaper, and better. FIGS. 13A-B show a comparison between how marketing campaigns have been developed and launched in the past (and in fact how it is done sometimes today), versus ideally how the process would work with the right tools. The top half of FIGS. 13A-B shows a 26-week process, and as shown there, for many companies even today, moving from marketing idea to campaign execution is a long, laborious series of steps. Collaboration is hindered by functional silos. Data are gathered in batch from external departments and outside agencies. By the time the campaign is out the door, the data have aged, leaving opportunity to more quickly moving competitors. By way of comparison, the bottom half of FIGS. 13A-B shows a 26-hour process. In the beginning, gathered in a quality circle, the cross-functional marketing team views analysis of real-time data, brainstorms ideas, and assigns responsibilities. Then, with integrated tools and data at their fingertips, they are able to move quickly, employing technology to integrate customer data, content, and fulfillment to deliver the marketing campaign, and getting it right the first time. While this is the goal of a marketing organizations, existing tools are falling short in enabling the marketing organization to reach these goals.

There are a wide variety of marketing campaigns that a marketing organization may launch. The type of marketing activities that are most effective differ from industry to industry. Some marketing campaigns have the goal of developing name-recognition, while others are focused on specific potential or existing customers. By way of example, marketing campaigns include general advertising in print media (newspapers and magazines, for example), on the air (radio and television), or on the Internet. Other marketing campaigns involve direct contact with potential or existing customers, by telephone, traditional mail or e-mail.

Many different computer software applications have been developed to assist in various aspects of the marketing process. Generally, the software applications have been designed to handle discrete functions in the process. For example, there are software applications for campaign management, campaign optimization, analytical modeling, analysis and reporting, to name some of the more important functions. Also, there are software applications to handle workflow, which typically are not designed specifically for a marketing organization but are sometimes used by marketing organizations.

Historically, the evolution of marketing organizations has been a tale of automation of the discrete marketing functions, with little integration of the functions. The current effort is to integrate the many "siloed" software applications. In some cases, specific software vendors have begun to offer software tools that include more than one of the discrete marketing functions mentioned above. For example, the software vendor E.piphany has recently combined its campaign management software with software that does marketing analysis and reporting. In some cases, software vendors are aligning or merging to combine their collective software capabilities, and through that process integration is occurring.

A problem with these integration efforts, from the perspective of the marketing organization, is the dependence on a single vendor (or aligned vendors). To achieve integration, many marketing organizations may be faced with the prospect of abandoning a software application in which there has already been a significant up-front capital investment in terms of buying the software and training employees to use it. Further, no software vendor (or alliance of vendors) has been successful in fully integrating the functions of a marketing organization, and in integrating customer feedback from on-going marketing campaigns into the process.

The marketing software applications discussed above are too often designed only for low-level functionaries. Within a marketing organization, employees serve different roles, and one software application does not fit all. For example, a marketing executive for the organization may be responsible for the marketing of many different products and services. A marketing manager, or brand manager, is responsible for all aspects of the marketing efforts for one or more specific products or services. A person responsible for data analytics (that is, a data analyst) analyzes marketing data to determine whether a proposed marketing campaign will be successful, and uses modeling tools and data from third-party sources to perform the job.

The concept of a "portal" is known in the context of the internet. Internet portals provide a user with a portal page that serves as a navigational aid to other internet sites. Also, companies like America Online (AOL) and Yahoo, who offer a general portal page to users who access the company's website, also allow individual users to create a customized portal page, specifying the information to appear on the customized portal page (for example, stock quotes, sporting event scores, and local weather reports), as well as links to specified websites. Some companies and organizations have developed their own "intranet" websites with access limited to employees and other authorized users. The "intranet" website may have information and website links that are helpful to the users.

SUMMARY

The invention provides a system for enabling real-time collaboration and workflow management of a marketing campaign within a marketing organization. In one aspect, the invention provides unique user displays for the marketing organization's computer system. A role portal component provides at least two respective role portals that correspond to at least two marketing roles within the marketing organization (for example, marketing executive, marketing manager, data analyst, etc.). A workbench component generates, on a user display, a workbench that corresponds to each of the role portals. Each workbench permits a user to access metric and workflow information associated with the corresponding marketing role.

In various embodiments, the workbench for each role comprises displayable web-pages that can be displayed on a user display. These web-pages may include, for example, a home page with high-level marketing information, a workflow view of marketing strategies and associated tasks. The workflow view may provide access to a workflow software application, and may provide access to computer-accessible reports that may be used in completing tasks. The displayable web-pages may also include a page for marketing campaigns, with perhaps access to campaign management or optimization software applications, and with metrics and other information about the campaigns. The displayable web-pages may also include a page for a user to access software applications for performing marketing analysis tasks.

Advantages of the invention may include one or more of the following. Users in a marketing organization are provided with more efficient tools with which to perform their jobs. The marketing organization and its various functions becomes more integrated. As such, the time needed to develop, analyze and launch a marketing campaign is greatly reduced. Also, real-time feedback from on-going marketing campaigns, perhaps from customers, is more integrated into the marketing process. As such, marketing organization may address the pressing demand placed upon it to perform marketing better, faster and cheaper.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5-12 are screen shots of a computer display displaying portal web-pages in accordance with the invention.

Like reference symbols in the various drawings indicate like elements.

DETAILED DESCRIPTION

Figure 1:
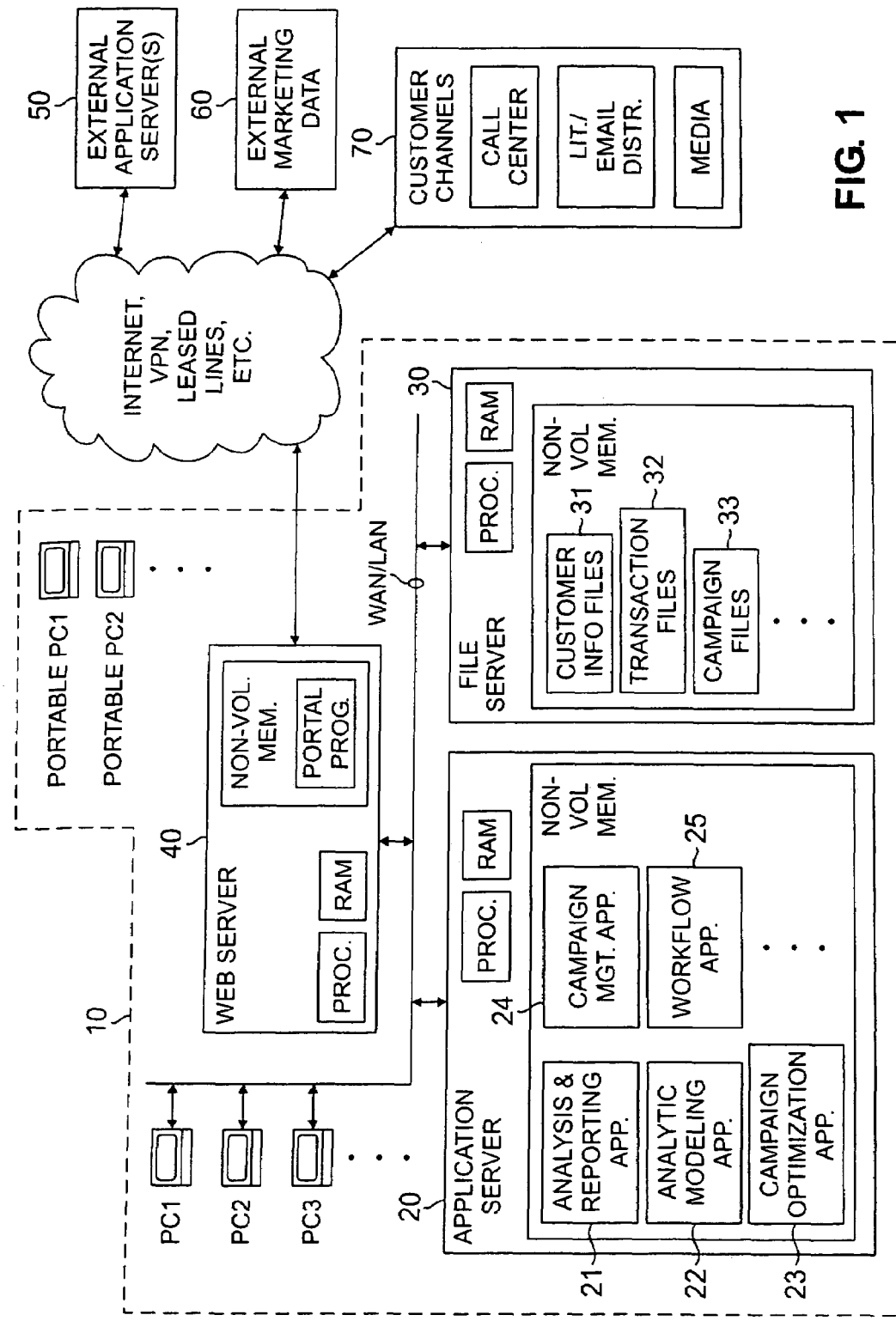
FIG. 1 is a block diagram of the physical layout of a networked computer system including aspects of the invention.

A system for enabling real-time collaboration and workflow management of a marketing campaign within a marketing organization may reside on a networked computer system 10 of the type shown in FIG. 1. The dashed line in FIG. 1 indicates the computer system 10, which includes, in this example, only the computing resources of the marketing organization and not third-party, or external, computing resources. FIG. 1 is only one example physical configuration for the system 10. As those skilled in the art will recognize, numerous variations from the physical configuration shown in FIG. 1 will be realizable without departing from the invention.

The exemplary computer system 10 shown in FIG. 1 includes various conventional centralized computer servers, namely, an application server 20, a file server 30, and a web server 40. The computing resources of the marketing organization may be interconnected by wide area network (WAN) or local area network (LAN) connections, depending on the geographic extent of the marketing organization. User personal computers (PC's), indicated as PC1, PC2, PC3, etc. in FIG. 1, may have access to the centralized servers 20, 30 and 40, as is conventional, although individual access rights will typically vary from user to user.

The web server 40, as is conventional, may serve as a gateway for access to external computer resources, via the internet, a virtual private line (VPN) within the internet, a private leased line, or some other connection. Persons within the marketing organization having remote PC's (indicated as Portable PC1, Portable PC2, etc.) may access the computer system 10 through the web server 40, and via the previously mentioned networks. In addition, the web server 40 may similarly provide PC's within the system 10 with access to external application server(s) 50, external marketing data 60, and customer channels 70 (e.g., a call center, advertising literature and e-mail distributors, and advertising media).

In addition to serving as a gateway to external computing resources, the web server 40 may have stored in its non-volatile memory a portal program 42 designed in accordance with the invention. The portal program 42, as will be discussed in more detail later, allows users to retrieve portal pages and have the pages displayed on their PC's (for example, PC1, PC2, PC3, etc., and Portable PC1, PC2, etc.) The portal program 42 may be in the nature of an "intranet" web-site. A wide variety of software tools are known and available to create the portal program 42. Use of these tools to create a portal program 42 having features that will be discussed later in this specification is well known in the art of software programming. In an embodiment that will be described later, portal development tools available from nQuire Software were used to create the portal program 42.

The portal program 42 consists of program instructions stored in non-volatile memory in the web-server 40. These instructions are executed by a processor in the web-server 40, upon requests being sent to the web-server 40, for example, from personal computers PC1-PC3 or portable computers PC1-PC2. Also stored in the web-server's 40 non-volatile memory are user portal files for each user of the system 10. Each user has a unique identifier, and so when a user accesses the web-server 40 for access to the user's portal, the web-server 40, using the user's unique identifier, accesses the appropriate user portal file, and provides the user with the appropriate requested portal page. In addition, each user has a role associated with their portal file. As such, their portal will have a default design that meets the needs of users fulfilling the role that the user serves in the marketing organization. As will be discussed later in this specification, each user also has the ability to modify further their portal, and when the user does this, the modifications are stored in the user's portal file.

The application server 20, as is conventional, stores applications that may not be available on the PC desktops. The software applications available on the application server 20 are stored in the server's non-volatile memory. In the case of a marketing organization, typical software applications assist in the marketing functions of analysis and reporting 21, analytical modeling 22, campaign optimization 23, campaign management 24, workflow 25, and perhaps other functions not shown in FIG. 1. As will be understood, a single software application may serve more than one of the indicated marketing functions. Also, in some cases, a software application may be available on one or more of the PC's, either in addition to being available on the application server 20 or instead of being available on the application server 20. Whether the software application is stored in the applications server or on the PC desktop is dictated by the computing resource demands of the application, pricing of the application, and other factors.

The file server 30, as is conventional, contains common files that many users may need to access. In the case of a marketing organization, the typical files, again shown in FIG. 1 stored in non-volatile memory, may include customer files 31 with information about customers (for example, address information, demographics, etc.), transaction files 32 with information about transactions with customers that have taken place (for example, when transactions occurred, where, quantity and amount information, etc.), and campaign files 33 with information pertaining to a specific marketing campaign.

Although the servers 20, 30 and 40 are shown separately in FIG. 1, it will be understood that this is merely illustrative, and not intended to dictate a particular physical configuration. For example, a single server device may actually satisfy all of the server functions of applications server 20, file server 30 and web server 40. Also, multiple servers may make up each of the illustrated servers 20, 30 and 40. These multiple servers may all be at a common location or may be distributed at different locations.

Figure 2:
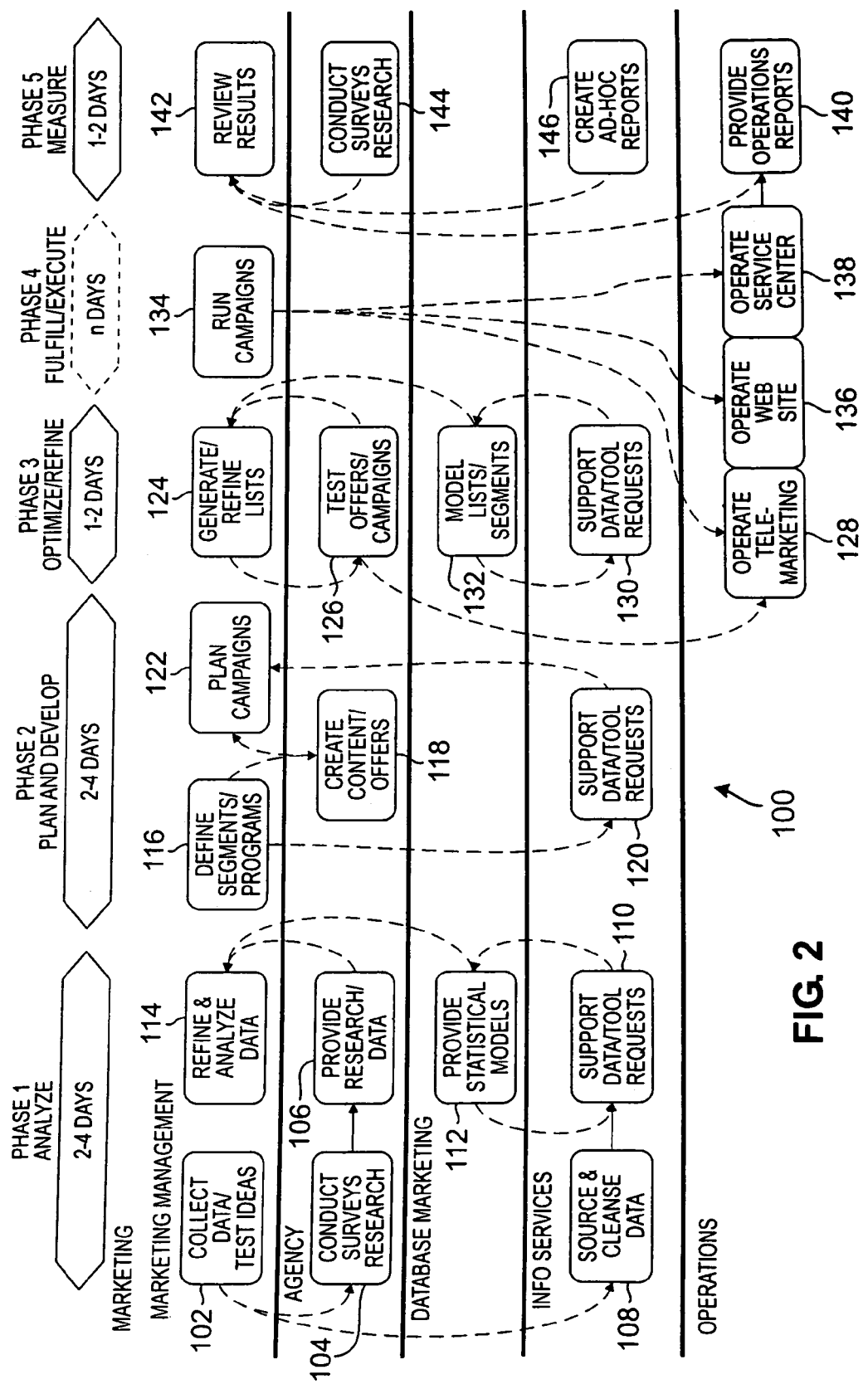
FIG. 2 is a flow diagram of an organization's marketing processes enabled by aspects of the invention.

In FIG. 2, a marketing process flow 100 illustrates a model marketing process where customer "insights" are fed back into the marketing process in real-time fashion. The phases of a marketing campaign are indicated along the top of the figure, and include (1) an analysis phase, (2) a phase where the marketing campaign is planned and developed, (3) a phase where the marketing campaign is optimized and refined, (4) a phase for fulfillment and execution of the marketing campaign, and (5) a phase where various metrics regarding the marketing campaign are measured. The days that may be required to complete each of the phases are indicated on the figure. It will be recognized that the time for each phase is in terms of days, as opposed to weeks which has been typical in the past. It will also be recognized that the number of days indicated on the figure are general estimates, and may be shorter or longer depending on the nature of the marketing campaign, nature of the industry, and other factors. With that said, however, FIG. 2 gives an example of typical times for the phases as follows: 2-4 days for phase 1, 2-4 days for phase 2, 1-2 days for phase 3, n days for phase 4, which will be dictated by the type of marketing campaign involved, and 1-2 days for phase 5.

FIG. 2 is also divided vertically to show the group responsible for the tasks shown in the figure. The groups are marketing management, agencies (for example, advertising agencies), database marketing (that is, external vendors of marketing data), information services (that is, data analysts), and operations. In the phase 1 (analysis), marketing managers determine, in block 102, the data that needs to be collected and the ideas that need to be tested. As shown by the arrows in FIG. 2, an agency then, at blocks 104 and 106, may conduct survey research and provide research and data back to marketing management. At the same time, a data analyst (information services) may, at block 108, source and cleanse data that will be helpful in determining an appropriate marketing campaign. Then, at block 110, the data analyst analyzes the data in various ways, which may include the use, at block 112, of statistical models provided by outside vendors (using, for example, server 50 in FIG. 1). The results of the analyst's work is then available to marketing management. At block 114, marketing management, using the results of the work done by the agency and the data analyst, refines and analyzes the data.

In phase 2, the planning and development phase, marketing management, at block 116, defines market segments toward which the marketing campaign will be directed, and the type of campaign, or program, that may be executed. The agency then creates content and offers, for example, to implement the campaign, at block 118, and the data analyst, at block 120, analyzes the proposed marketing campaign to determine its probability of success. The results of this work is provided to marketing management, who then plan the execution of the campaign, at block 122. Then, the marketing campaign, in phase 3, will be optimized and refined. Marketing management, at block 124, generates and refines lists of customers, for example. Then, at block 126, the agency may test the offer or campaign, as the case may be, and may use a telemarketing group to do so, as indicated by block 128. Information from the test is made available to marketing management for further refinement of the lists, at block 124. While the agency is doing its tests, the data analyst may, at block 130, be analyzing the lists and segments using a modeling program (block 132), which again may be provided by an external vendor (server 50 in FIG. 1, for example).

In phase 4, fulfillment and execution, the campaigns are run, as indicated by block 134. Various customer interaction channels may be used for this, for example, telemarketing (block 128), a web-site (block 136), and a service center (block 138), to name a few examples. These channels, in various forms, provide operations reports, as shown by block 140, the results of which, in phase 5 which may overlap with phase 4, are available for marketing management to view, at block 142. In addition, as part of phase 5, the agency may also conduct surveys research, at block 144, and the data analyst may create various ad-hoc reports, at block 146, both of which would also be available for marketing management to view, at block 142.

Figure 3:
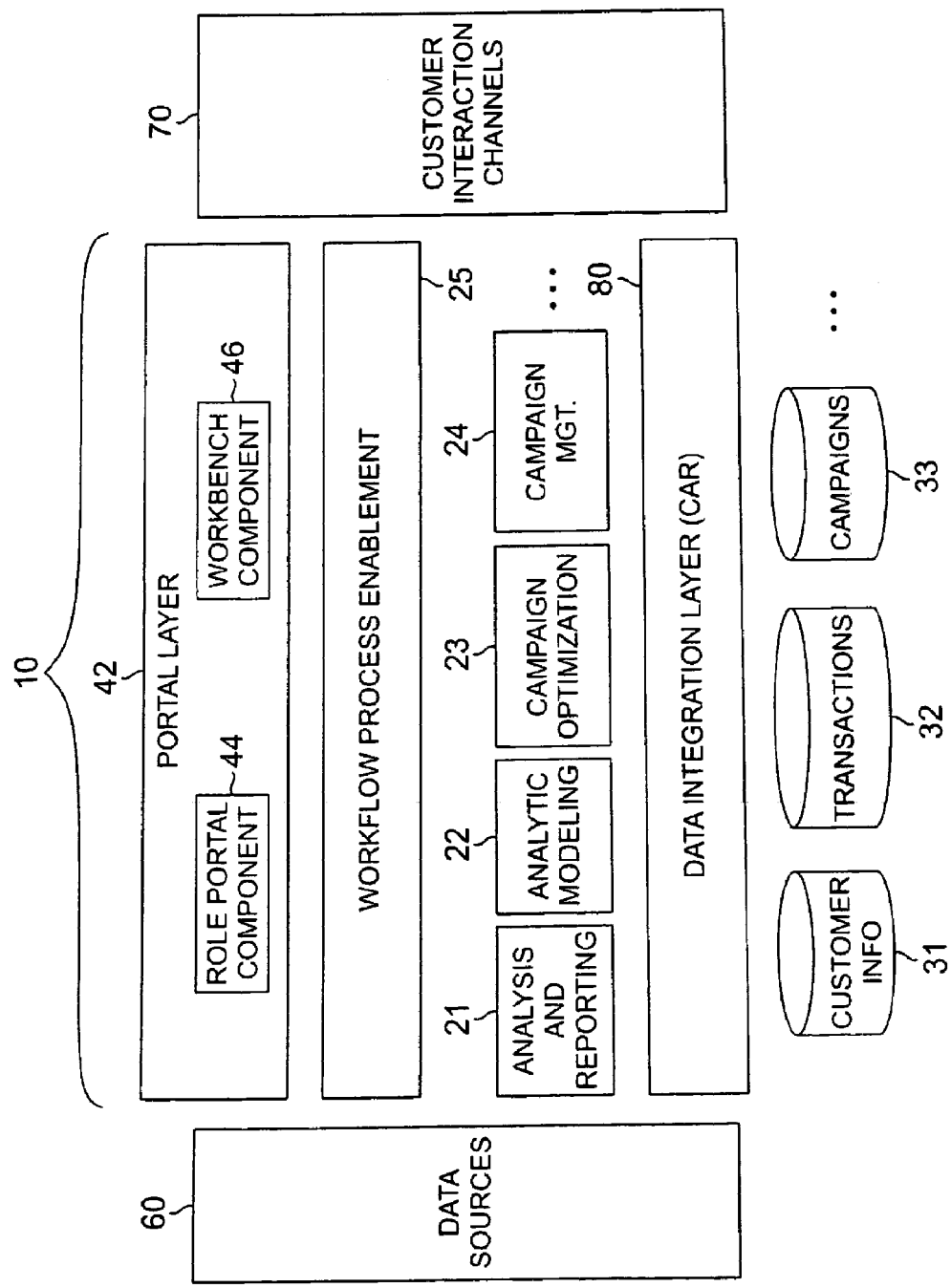
FIG. 3 is a conceptual diagram of a software architecture that may be implemented on the networked computer system of FIG. 1.

In FIG. 3, a conceptual depiction of the computer system 10 of FIG. 1 illustrates the novel architecture of the system 10. This conceptual depiction is not dependent on the physical configuration of the system 10 shown in FIG. 1, as will be appreciated by those skilled in the technical field. As mentioned previously, the computer system 10 of FIG. 1 includes a portal program 42 in accordance with the invention. In FIG. 3, the portal layer 42 is shown at the top of the conceptual depiction of the system 10 because the portal layer 42 provides users with views and access to information and applications within the system 10. The portal layer 42 may be in the nature of an organizations's "intranet" site. The portal layer 42 includes a role portal component 44 and a workbench component 46. The role portal component 46 provides a baseline portal design that is tailored to the needs of the type of role that the user serves in the marketing organization. The workbench component 46 is the aspect of the portal that is displayed to the user on a PC and which permits the user to access software applications and marketing information appropriate for the role of the user.

A workflow process enablement block 25 is shown below the portal layer 42, because the portal layer 42 provides access to workflow tools. Because there is workflow associated with each of the different marketing functions 21-24, the workflow process enablement block is shown overarching over all of the marketing functions 21-24 to completely integrate them within the marketing organization. A data integration layer 80 integrates all of the databases 31-33 together and provides a logical view of all of the information contained in all of the databases 31-33. Finally, the external data sources 60 and customer interaction channels 70 are shown to the sides of the system 10, but integrated with the system 10.

Figure 4:
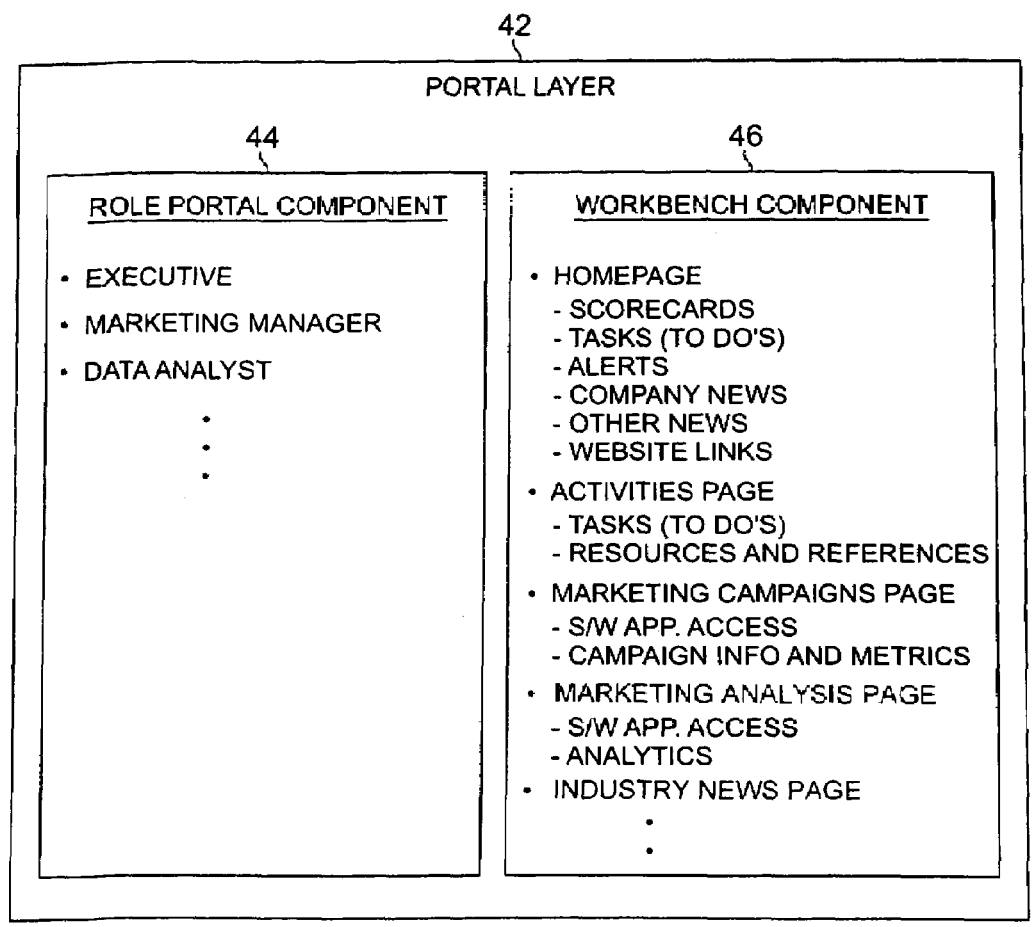
FIG. 4 is a conceptual diagram of the design of the portal layer included in the software architecture of FIG. 3.

In FIG. 4, the conceptual design of the portal layer 42 is shown in detail. As mentioned previously, the portal layer 42 may be in the nature of a organization's "intranet" site. Unlike a typical "intranet" web-site, however, the portal layer 42 "intranet" will be user-specific, and tailored to the role the user serves in the marketing organization. As shown in FIG. 4, the portal layer 42 includes the previously mentioned role portal component 44, within which is identified example roles that may be appropriate for a particular marketing organization. The example roles are executive, marketing manager, and data analyst. Other roles may be appropriate depending on the organization.

The workbench component 46 may include several portal web-pages. Users will have ready access to the different portal web-pages included in their workbench. The first portal web-page will typically be a home page. On the homepage there may be top-level information such as top-level scorecards for marketing efforts, a listing of tasks to perform, important alerts, company and other news, and website links. Second, there may be an "activities" page, which consists of a listing of tasks that need to be completed (which may be provided in this page instead of on the home page, or in addition to appearing on the home page), as well as computer-accessible resources that may be helpful to the user in completed the tasks. Third, there may be a "customer campaigns" page. On this page there may be links to various software applications, such as the campaign management software application 24 and the campaign optimization software application 23 (see FIG. 1). Also on the "marketing campaigns" page there may be high-level information describing the campaigns and metrics pertaining to the campaigns. Fourth, there may be a "marketing analysis" page, which may be most applicable to data analysts. On this page, there may be access to an analytical modeling software application 22 or 50 (see FIG. 1), as well as the results of analyses. Finally, there may be an "industry news" page.

Importantly, the workbench component 46 is designed to provide pages that give the most applicable information to a user according to the role the user serves within the marketing organization. For example, the baseline design of the workbench component 46 for an executive will be more top-level in nature, whereas low level functionaries may have more detail for projects that fall within their responsibility, but with perhaps less breadth in terms of the projects that are on the workbench. In addition, users may be provided with the ability to customize their workbench component, although the role-specific character of the workbench component may continue to persist even after customization.

Figure 5:
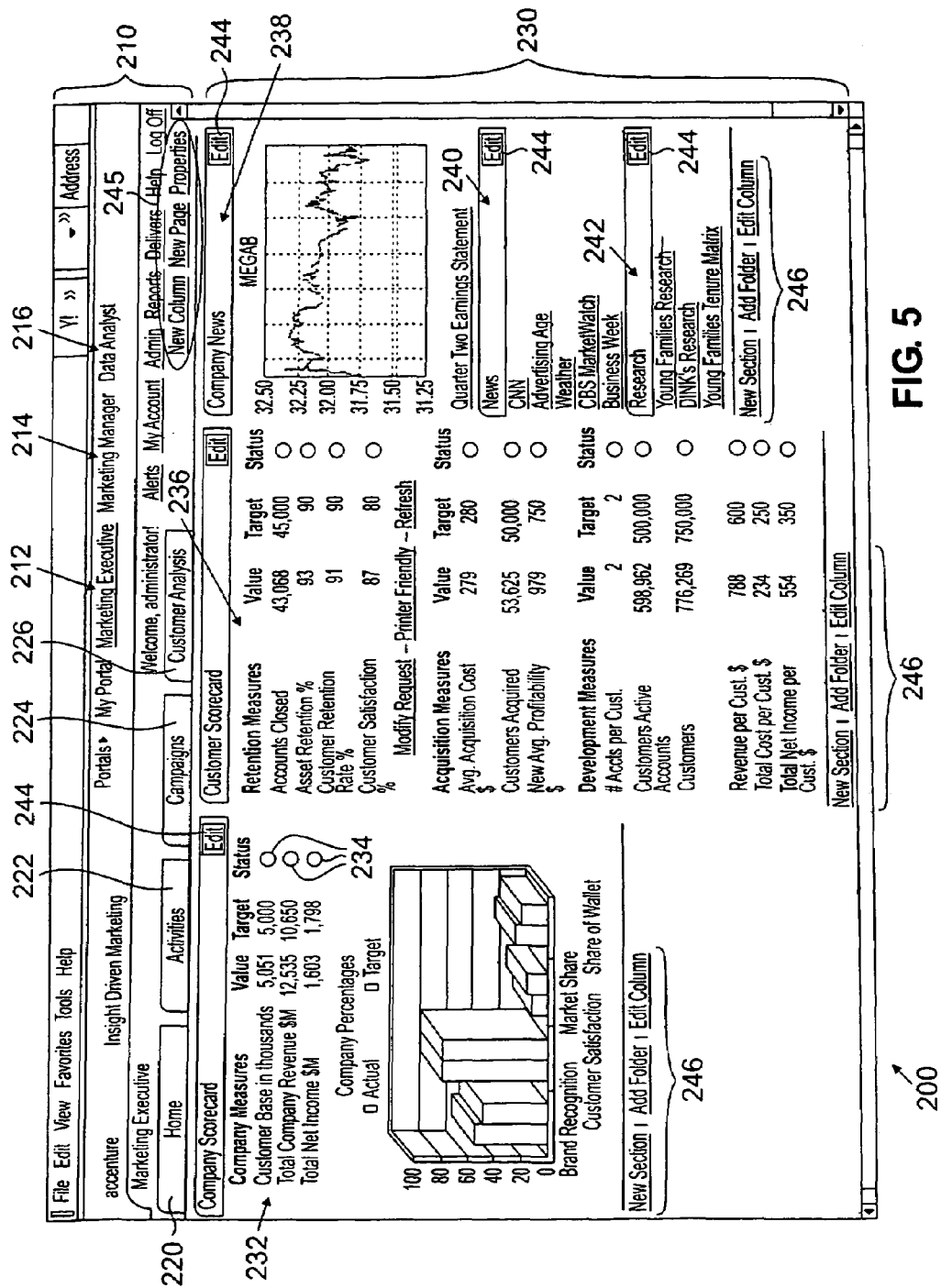

FIGS. 5-12 show example portal web-pages that may be displayed on the PC of users. In FIGS. 5-12, the portal-web pages are for a marketing organization for a fictitious on-line stock trading company. FIG. 5 is a display 200 that includes an example portal home page 230 for a marketing executive user. On the top of the display 200 is a portal page selection portion 210 of the display 200. In this selection portion 210, selectable labels 212, 214 and 216 enable the selection of the role of marketing executive, marketing manager, or data analysts. It bears noting that the executive's display 200 may not actually have labels 214 and 216 for the non-relevant roles of marketing manager and data analysts, although that option may be desirable in some cases. In any event, the display 200 shown in FIGS. 5-12 are examples of displays that may be provided to a systems administrator, and thus may have more options than any one user's display may have. The underline of the executive role label 212 indicates that the executive role is currently selected, and thus executive portal pages will be displayed in the lower portion 230 of the display 200. Also in the portal page selection portion 210 of the display 200 are tabs 220, 222, 224 and 226 to select the type of workbench page—home 220, activities 222, campaigns 224, or customer analysis 226. The highlighting of the home page tab 220 indicates the home page is selected, and thus a home page is the type of workbench that is displayed in the lower portion 230 of the display 200.

The executive home page 230 (FIG. 5) includes the workbench categories for the home page shown in FIG. 4 and previously discussed. On the viewer's left side of the home page 230 is a company scorecard 232. A wide variety of metrics may be displayed under this scorecard. For example, the company scorecard 232 may include high-level key company customer retention and financial metrics, as shown in FIG. 5. For each metric, the scorecard 232 may provide a current "value" for a specified time period, a "target" for the same time period, and a "status" indicator. Color-coded status indicators 234 may be included for each scorecard metric, with green indicating "on target," yellow indicating "at risk," and red indicating "off target." An alternative or additional scorecard that may be included on an executive home page 230 may be an "employee scorecard" showing overview information about employees for whom the executive is responsible (for example, number of employees and attrition rate), and revenues per employee. Again, color-coded status indicators may be included for each employee scorecard metric.

A customer scorecard 236 may be positioned in the middle of the home page 230. Positioning the customer scorecard 236 in the middle is helpful because this information is often the most important information needed by the user. The customer scorecard 236 may include key customer metrics in retention, acquisition and development. In the example shown where the marketing organization is for an on-line stock trading company, the retention measure metrics may include, for examples, the number of accounts closed over a specified period, percent asset retention, percent customer retention rate, and percent customer satisfaction. For each metric, the customer scorecard 236 may provide a current "value," a "target," and a "status," as discussed previously in connection with other metrics. Next, the "acquisition measures" may include an average cost of acquiring a new customer, the number of customers acquired, and an average profitability measure for new customers. Then, the "development measures" may include the number of accounts held by each existing customer, the total number of active customer accounts, the number of customers, and revenues, costs and net income per customer. Again, for each of these metrics, the customer scorecard 236 may provide a current measure, a target measure, and a status indicator.

On the right-hand side, the home page 230 may provide company news 238, news links 240 and research links 242. The company news 238 shows a stock chart for the company (ticker symbol "MEGAB"). Also provided in the company news 238 is a hyperlink to the most recent quarterly earnings statement. The news links section 240 of the home page 230 has links to various new source web-sites, some being of specific interest for executives in a marketing organization for an on-line trading company (for example, the "CBS Marketwatch" link), and others being of general interest (for example, the "Weather" link). The research links 242 may include market research reports that to which the marketing executive may need ready access. These market research reports may be reports created specifically by the marketing organization, and stored within the marketing organization's computer resources (for example, in the file server 30 shown in FIG. 1). Alternatively, the market research reports may be available from an external source (for example, from an outside vendor 60 shown in FIG. 1).

For each metric category (232, 236, 238, 240 and 242) included in the executive's home page, it is possible to edit, or personalize, the information that appears in each category. These function are made possible in conventional portal development tools, such as the tools provided by nQuire Software as were used in this case. For example, typically there will be a default display that is the same for each role, and then the specific user may personalize the workbench categories starting from that baseline. This is done by clicking on an "edit" label 244 associated with the category to edit. The editing may be done similarly to how the editing of personal portal web-pages is conventionally performed. For example, after clicking the "edit" label, the user is provided with the ability to add metrics, information, or links. In addition, the layout of the page 230 may be revised, as is conventional with personal web-pages, with tools accessible at labels 245 identified as "new column," "new page," and "properties." The layout of individual columns on the page 230 may be revised, as is also conventional, with tools accessible at labels 246 identified as "new section," "add folder," and "edit column."

Figure 6:
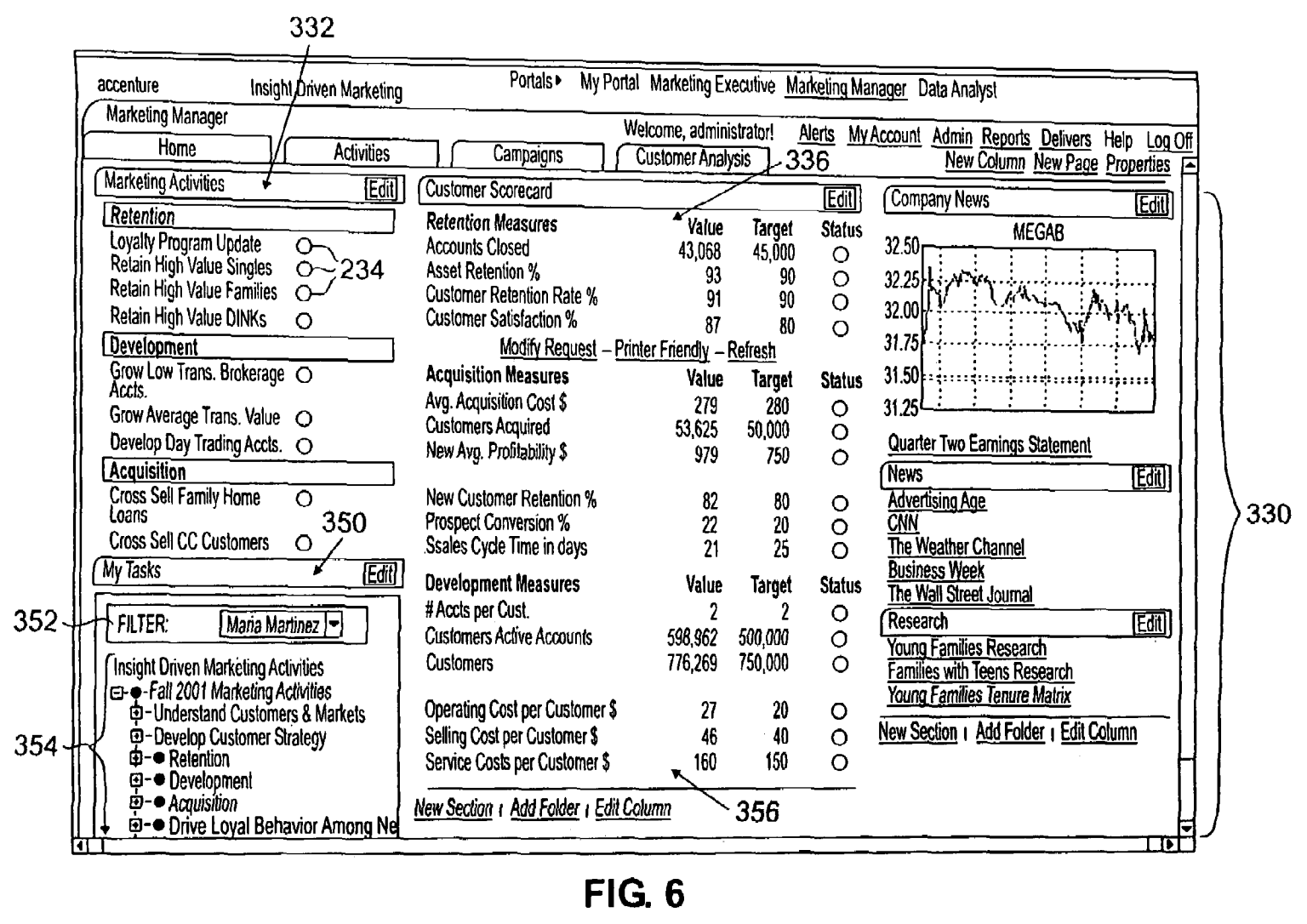

As shown in FIG. 6, a portal home page 330 for a marketing manager is similar in some respects to the portal home page 230 for the marketing executive (FIG. 5), but also different in some respects. The categories that are the most different are in the left-hand side of the home page 330. The marketing manager home page 330 includes a scorecard 332 for specific marketing activities, along with status indicators 234 of the type previously discussed. More specifically, the marketing activities scorecard 332 breaks down the marketing activities into customer retention activities, customer development activities, and customer acquisition activities. Retention activities include programs such as a loyalty program, a program to retain high-value single customers, etc. Development activities include programs directed at growing brokerage accounts with low transaction numbers, growing the average transaction value, etc. Finally, the acquisition activities include programs aimed at cross-selling family home loans and credit card ("CC") customers, for example.

Next, the home page 330 includes a workflow workbench called "my tasks" 350. This workflow workbench may make use of a workflow software application 25 provided on the application server 20 (see FIG. 1). A filter 352 allows the user to enter the name of a person whose assigned tasks are to be displayed. The user's own name may typically be the default. The workflow workbench 350 may also include a list 354 of tasks to be performed. The list 354 may have conventional "drill-down" capability, so that broad tasks may be expanded to show specific tasks that make up the broad task. The user may interact with the workflow software application. Access to the workflow software application, in this example, is not provided on the home page 330, but is provided in an "activities" page, to be discussed later.

The customer scorecard 336 for the marketing manager may be similar to the customer scorecard 236 for the marketing executive (compare FIG. 5). The only difference in this example is that a different type of cost data 356 is provided which is more tailored to the marketing executive's needs. Other workbench categories (company news, news and research) for the marketing manager in this example are generally the same as with the marketing executive, except for a few differences attributable to personalization by the user.

Figure 7:
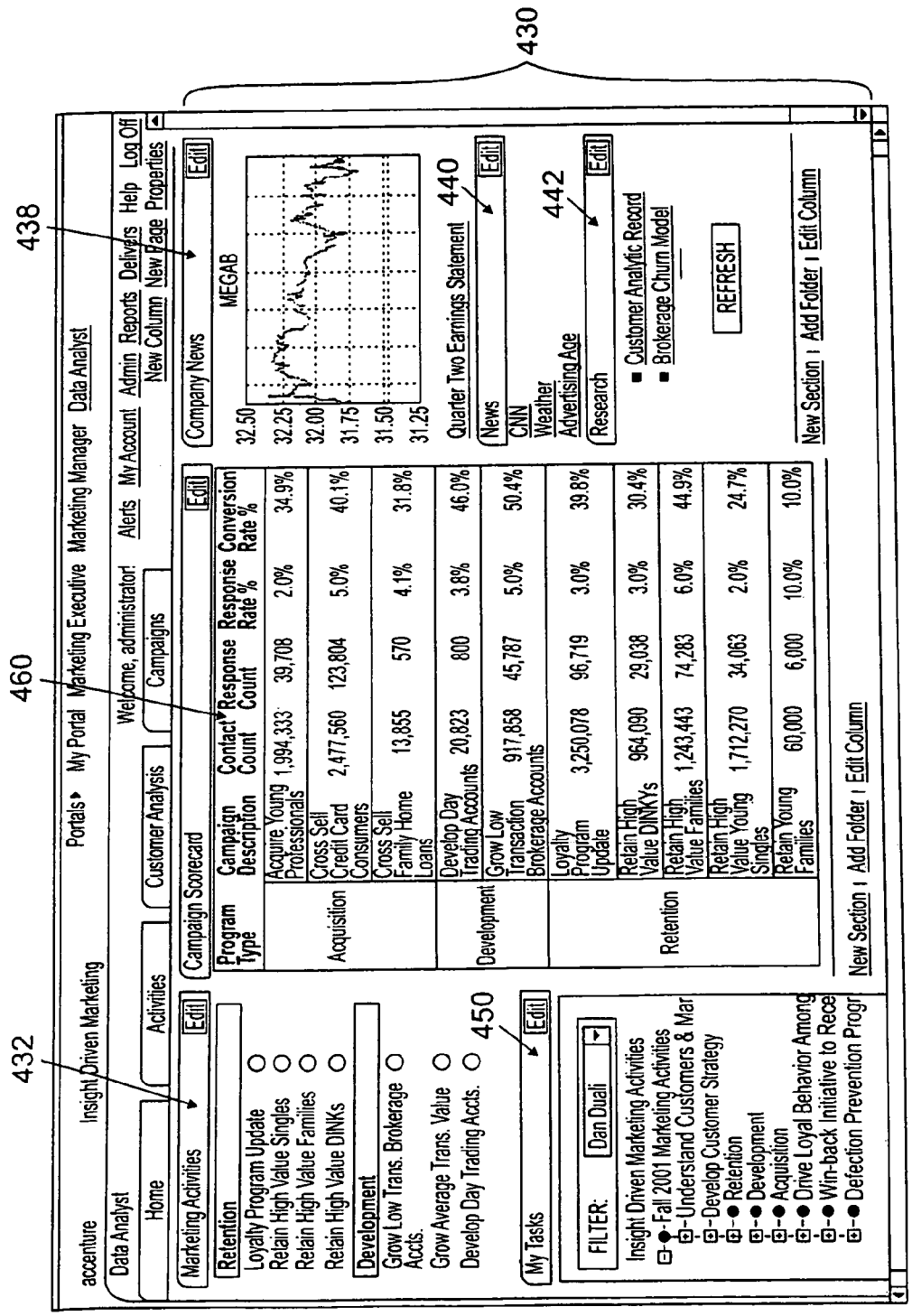

FIG. 7 shows a portal home page 430 for a user having a data analyst role. In this home page 430, the workbench components of marketing activities 432, "my tasks" 450, company news 438 and news 440 are all general the same as with the marketing manager home page 330 (FIG. 6), with slight differences attributable to personalization. In the research links category 442, the types of links identified are those that are more applicable to the data analyst role. In this example, the research links 442 include a link to a customer analytic record and a specific analytic model (called a "brokerage churn model"). The major difference between the data analyst homepage 430 and the home pages for the other roles lies in the campaign scorecard 460 provided in the center of the home page 430. The campaign scorecard 460 provides metrics pertaining to specific marketing campaigns (specifically, the campaigns listed in the "marketing activities" workbench area 332 of FIG. 6 and 432 of FIG. 7). For each marketing program, or campaign, the campaign scorecard 460 provides a campaign description, the count of contacts made in the campaign, the number of responses, the response rate, and the conversion rate for those who responded.

Figure 8:
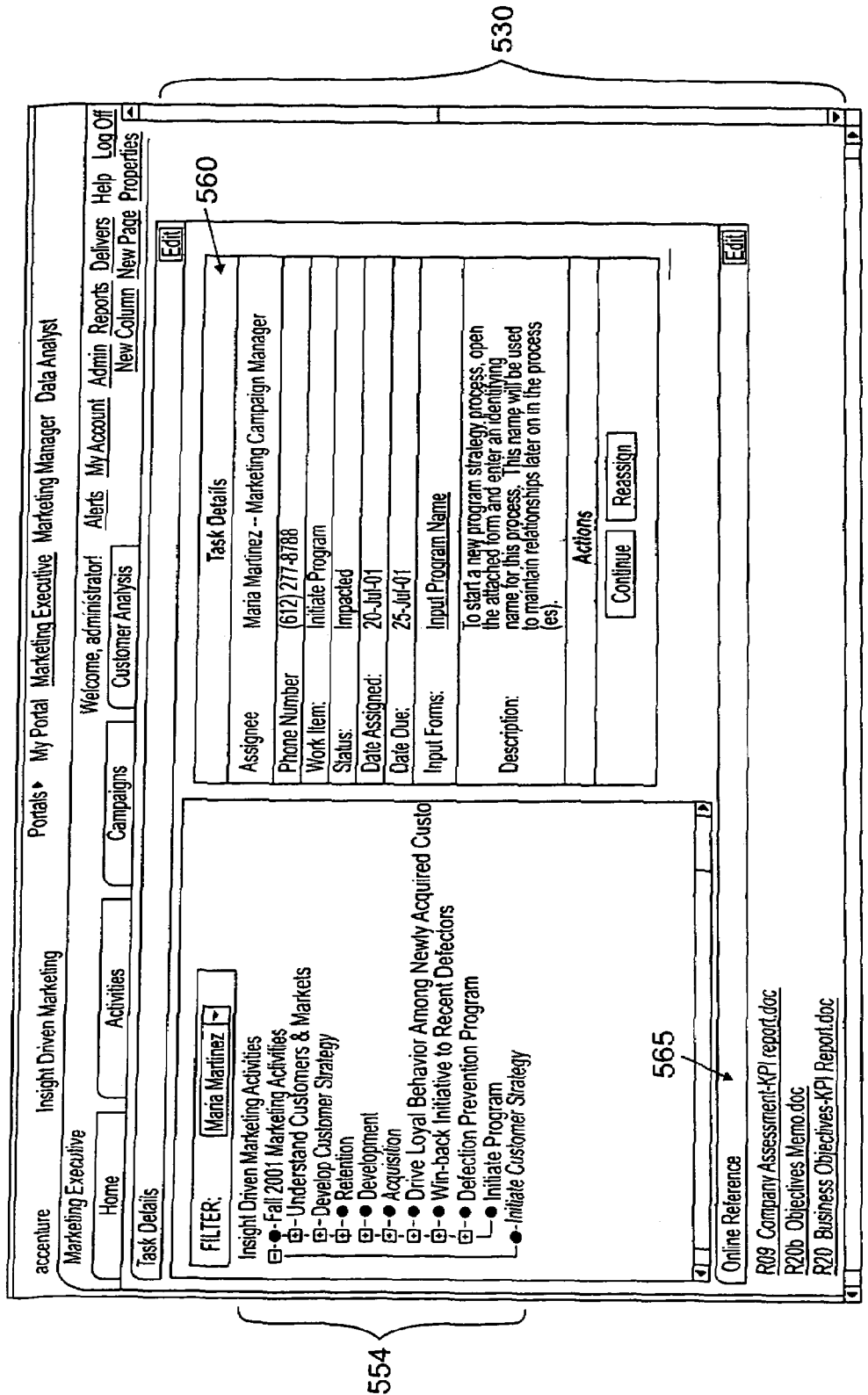

FIG. 8 shows an "activities" page 530 for a marketing executive. Although this page 530 is for an executive, "activities" pages for other roles may be generally similar, and thus are not shown in this specification. A "task details" workbench area 560 provides details about specific tasks selected in the task listing 554. As mentioned previously, the user may interact with the workflow software application that may run on a central applications server (for example, the applications server 20 shown in FIG. 1). The "task details" workbench area 560 provides the interface through which a user interacts with the workflow software application 25 (see FIG. 1). Using the "task details" workbench area 560, a user is able to enter new tasks to be done, indicate tasks are completed, and other conventional actions. The "activities" page 530 also includes links to online references 565 that may assist the user in completing assigned tasks. These online references, in this example, are references that are stored within the marketing organization's computing resources 10, although in some cases the online links 565 may include links to resources maintained externally.

Figure 9:
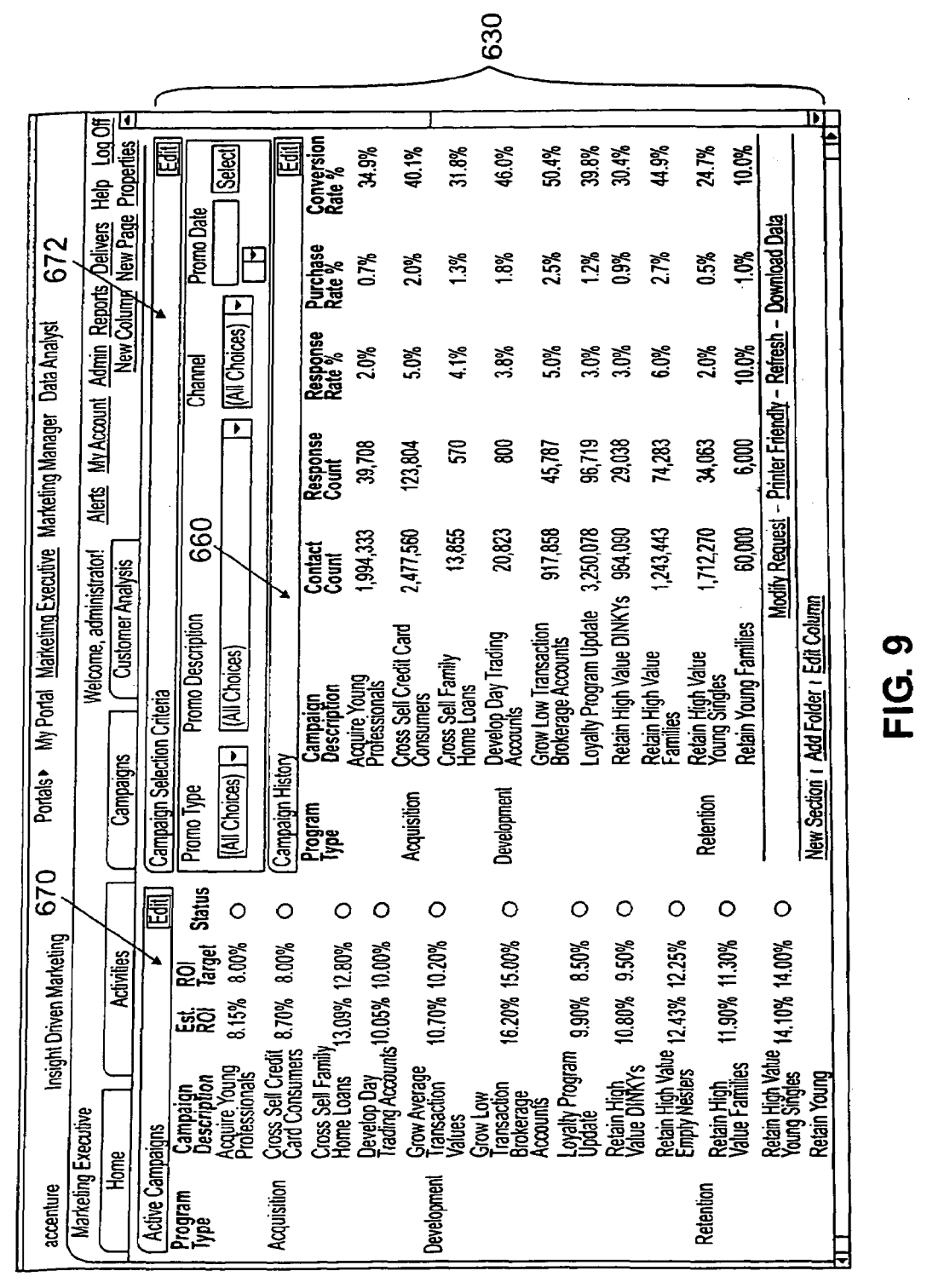

FIG. 9 shows a marketing "campaigns" page 630 for a marketing executive. On the left side of the executive's campaign page 630, an "active campaigns" workbench area 670 identifies the various marketing campaigns currently underway, and for each provides high-level return-on-investment (ROI) metrics. The executive's campaigns page 630 also includes a campaign history workbench area 660, which is similar to the campaign scorecard 460 provided on the data analyst's home page 430 (see FIG. 7), except that the campaign history workbench area 660 shown in FIG. 9 includes an additional spreadsheet column showing the percent of contacts in which there was a purchase (which is simply the response rate percentage multiplied by the conversion rate percentage). Finally, the campaigns page 630 includes a tool 672 to select the campaigns that will be shown in the campaign history workbench area 660. Selection categories, as shown in FIG. 9, may include the type of campaign, or promotion (e.g., acquisition, development, and retention), a description of the promotion, the marketing channel for the campaign (e.g., e-mail solicitations, mailings by traditional mail, and telephone solicitations), and the date of the campaign.

Figure 10:
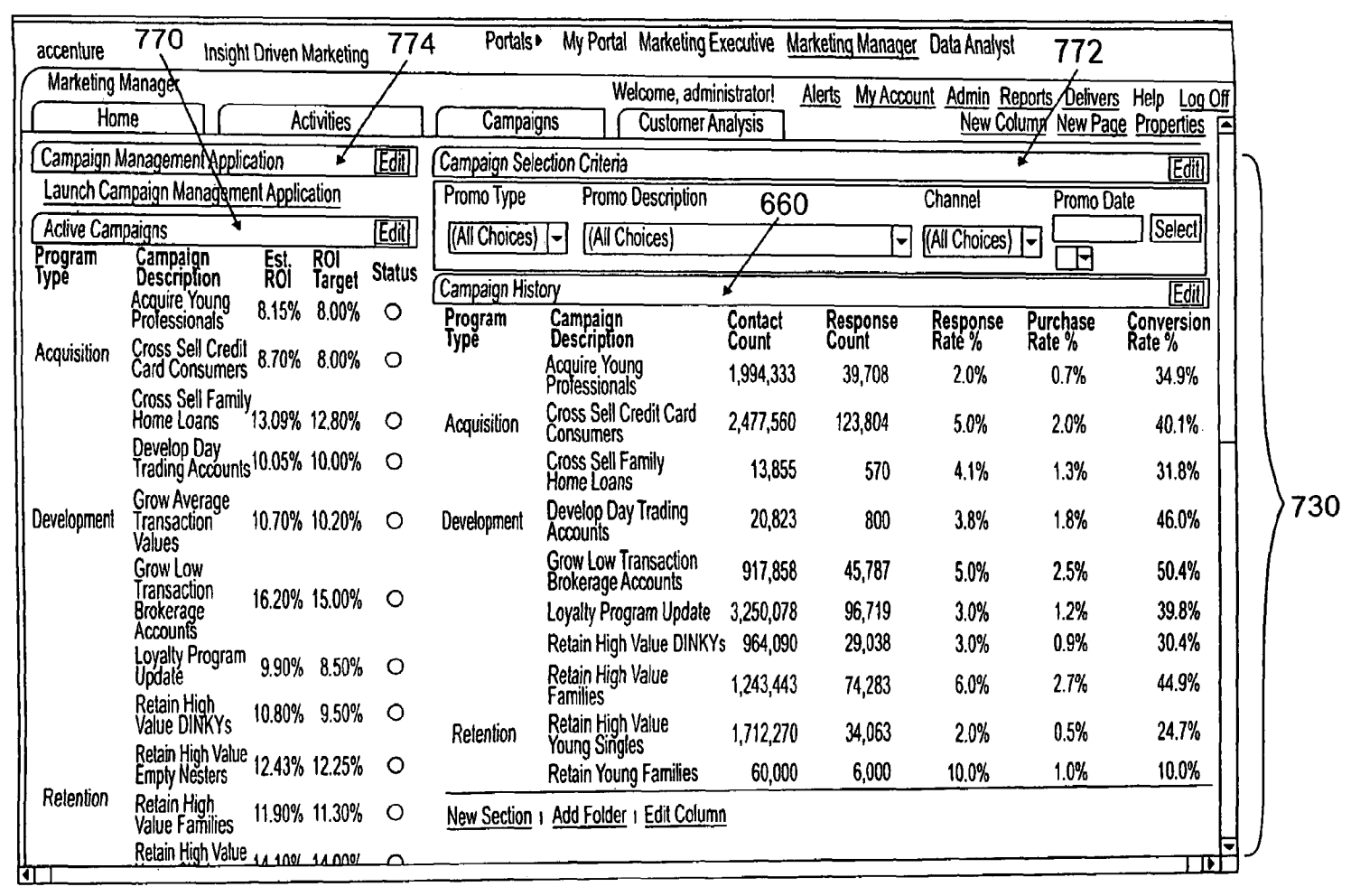

FIG. 10 shows a campaigns page 730 for a marketing manager. This campaigns page 730 is very similar to the campaigns page 630 for the executive (FIG. 9). The only difference is that the marketing manager's campaigns page 730 includes a workbench area 774 for access to a campaign management software application 25 which may reside on the applications server 24 shown in FIG. 1. A user having a marketing manager role will traditionally be the person whose job function requires use of the campaign management software application 25. An executive user, by way of contrast, will typically not need to use the campaign management software application 25, and so access to it is not provided on the executive's campaigns page 630 (FIG. 9).

Figure 11:
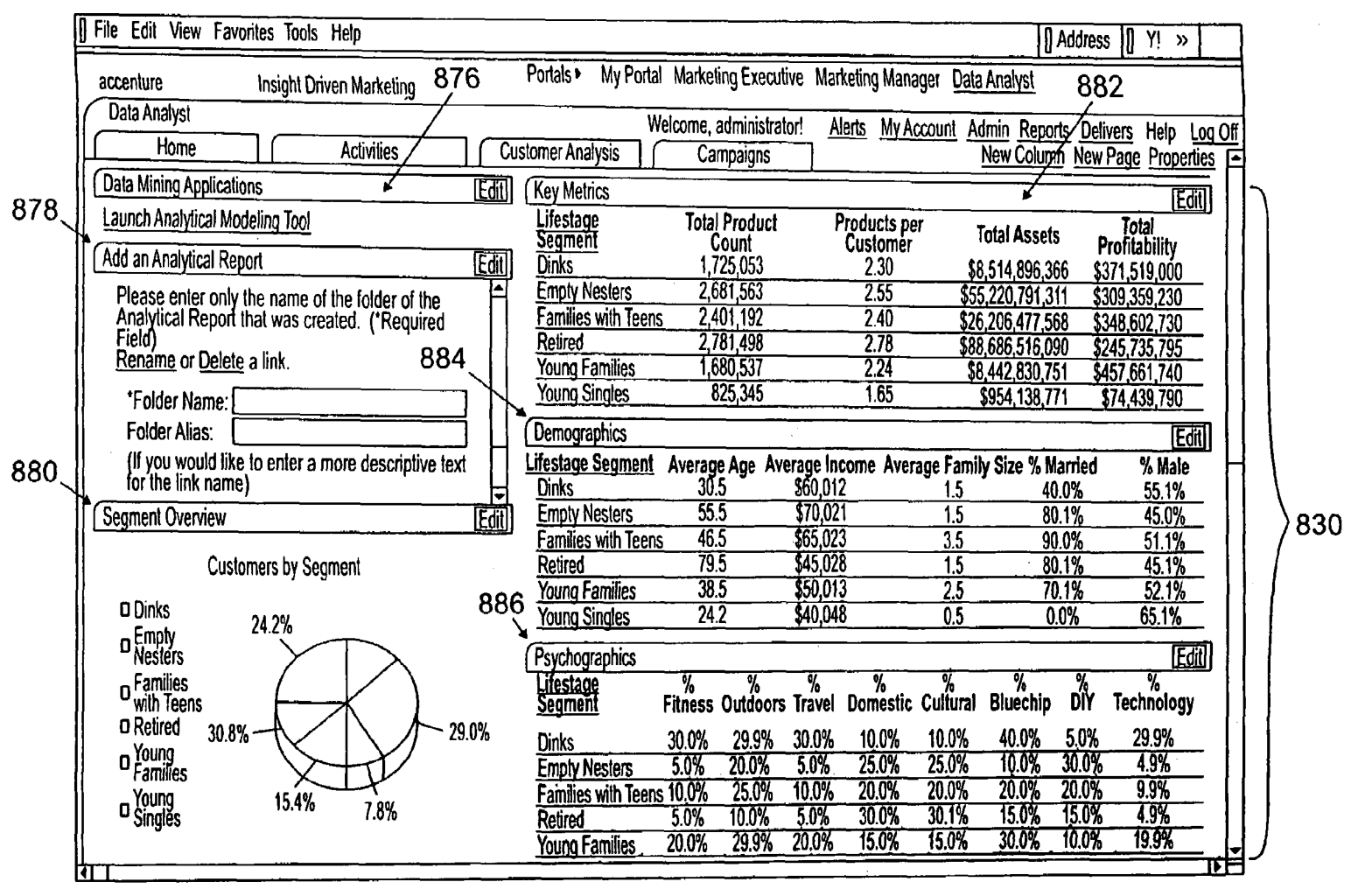

FIG. 11 shows a "customer analysis" page 830 for a data analyst. In the upper-left of the page 830, a workbench area 876 provides access to an analytical modeling software application, such as application 22 provided on applications server 20 (FIG. 1). Such access is provided because typically the data analyst job function requires frequent access to the modeling software application 22. Another workbench area 878 allows the data analyst add a marketing report that was created using an outside vendor's services (accessing server 50 or database 60, shown in FIG. 1) into the computer system 10 for the marketing organization. Adding the created report to the organization's computer system 10 allows it to be accessed by others. Next, a segment overview workbench area 880 shows customer breakdowns for a specified market segment.

On the right-hand side, the data analyst's "customer analysis" page 830 provides various detailed metrics regarding customers. These metrics are all broken down by customer type (for example, dual income no kids ("Dinks"), empty nesters, families with teens, retired, young families, and young singles). A key metrics workbench area 882 may provide metric information such as total product count, products per customer, total assets, and total profitability. A demographics workbench area 884 includes metrics, again broken down by customer type, including, for example, average age, average income, average family size, percent married, and percent male. Finally, a psychographics workbench area includes metrics such as percentages of customers who value fitness, spend time outdoors, travel a lot, work in the home ("domestic"), engage in cultural activities, would be likely to invest in "blue chip" investments, and are "do-it-yourselfers."

Figure 12:
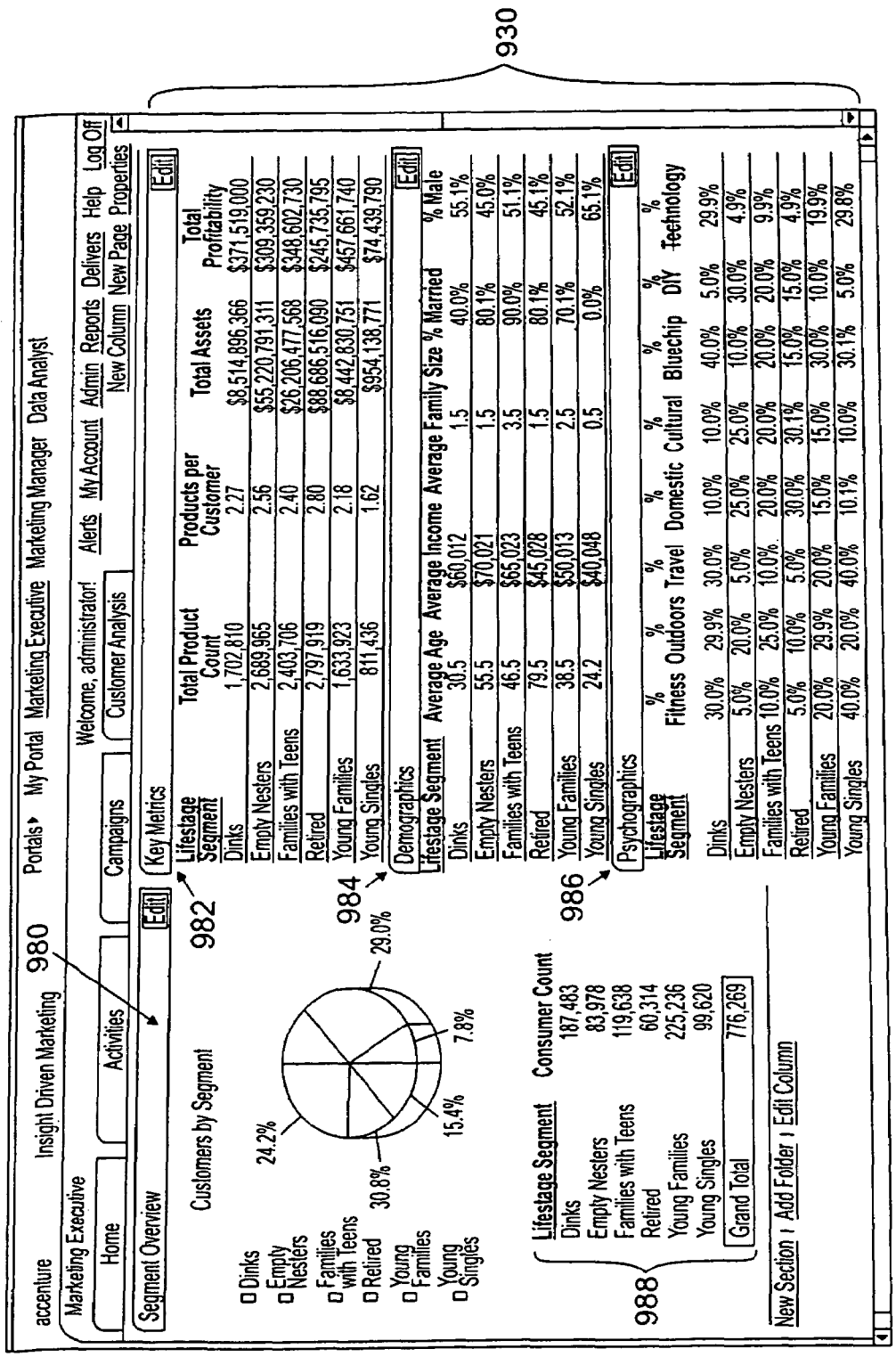
Figure 13A:
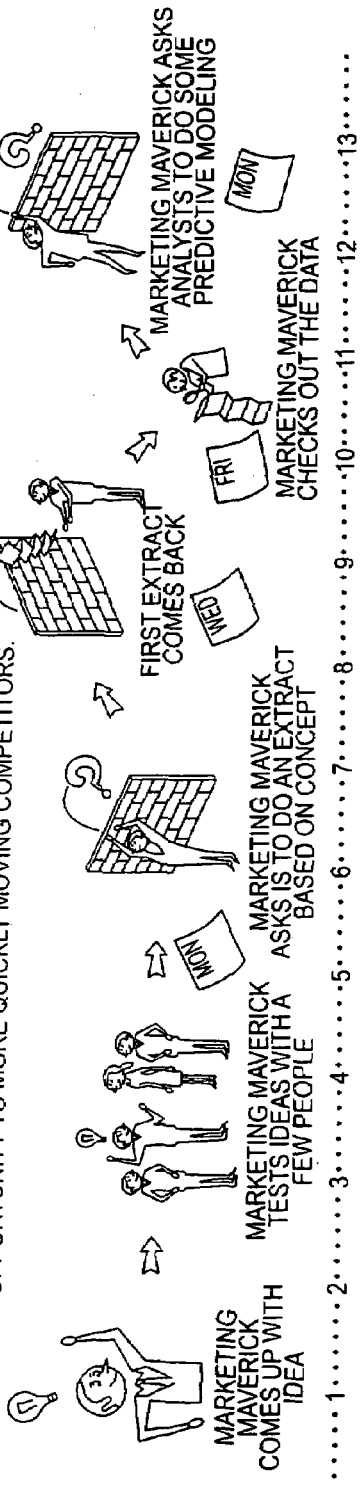
FIGS. 13A-B are two parts of a pictorial diagram showing a comparison between how marketing campaigns have been developed and launched in the past (and in fact how it is done sometimes today), versus ideally how the process would work with the right tools, such as the tools provided by the invention.
Figure 13A:
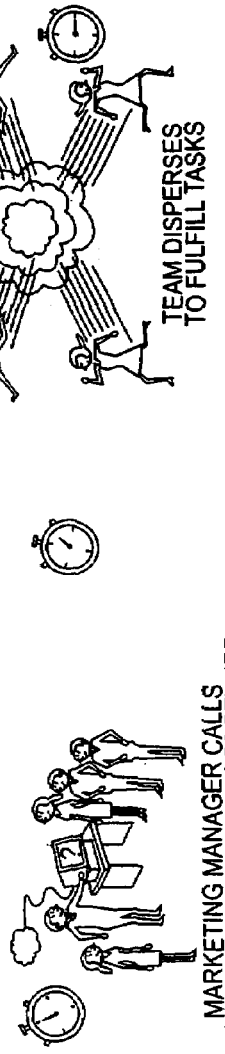
Figure 13B:
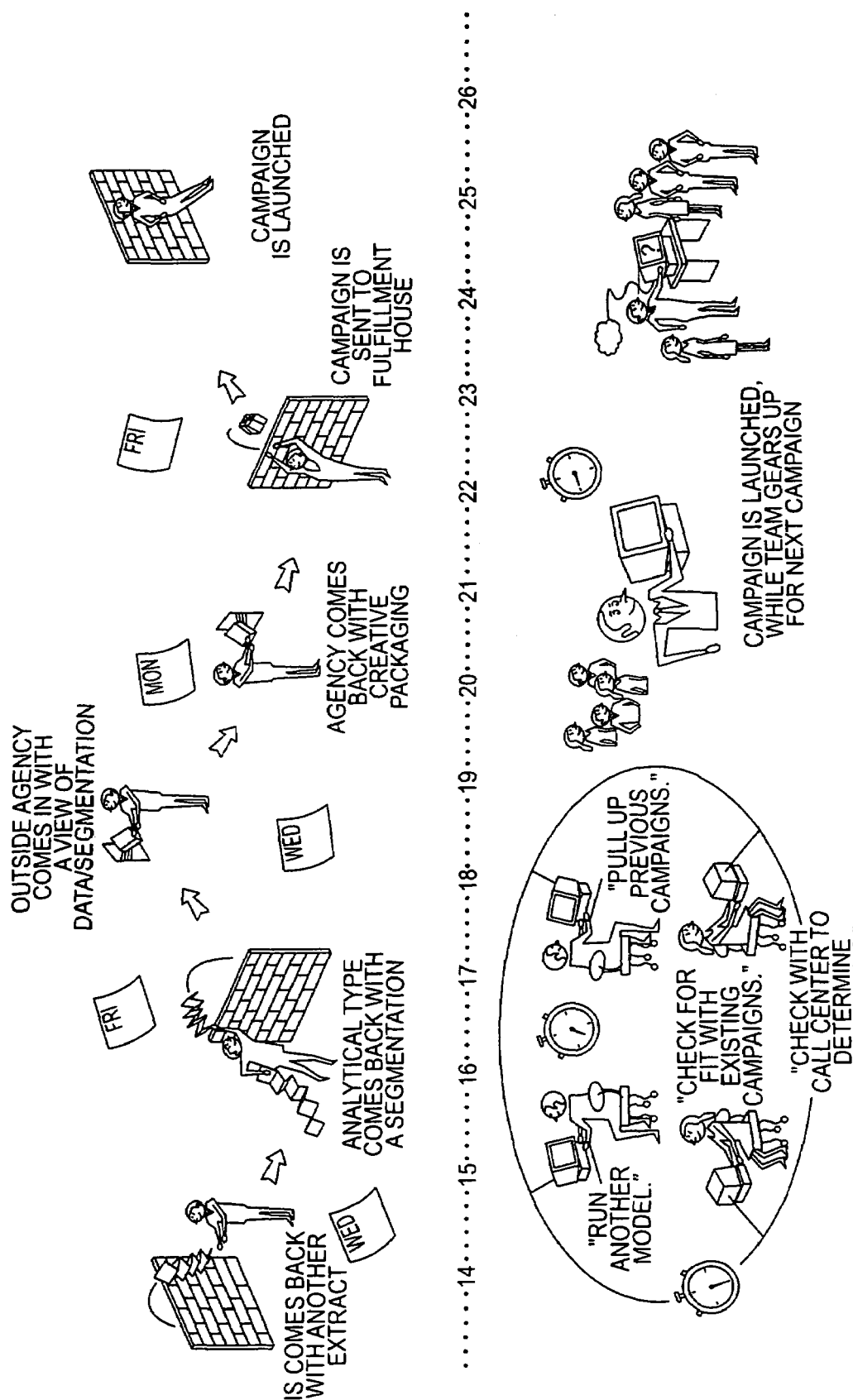

FIG. 12 shows a customer analysis page 930 for an executive. This executive customer analysis page 930 includes a segment overview area 980 as with the data analyst customer analysis page 830 (FIG. 11). However, the segment overview area 980 for the executive includes additional information 988 giving the consumer count for each of the consumer types. The executive customer analysis page 930, unlike the data analyst customer analysis page 830 (FIG. 11), does not include a workbench area 876 that provides access to an analytical modeling software application. Nor does the executive customer analysis page 930 include area 878 for adding a marketing report into the computer system 10 for the marketing organization. These workbench areas are not provided for the executive because they are typically not functions performed by the executive. On the right-hand side of the executive's customer analysis page 930, the same metric information is shown as is shown on the data analyst's customer analysis page 830 (FIG. 12).

Referring again to FIG. 2, it will be appreciated that with the various tasks occurring concurrently, the system 10 provides users with the information they need, when they need it, so the process is not unnecessarily delayed. For example, the results of the work done by the marketing manager and the data analyst are immediately available to each other, and to other marketing managers and data analysts. Moreover, it will be appreciated that the portal program uses role information to provide users with the information and access to resources that users need to fulfill their roles, without being deluged with lots of data and information that has no bearing on their job function, and thus leads to inefficiencies. Another advantage of the invention is the reduction of training time needed for users to use the organization's computer system to do his or her job, which in some cases (for example, executives) may be a complete barrier to a user using available computing resources.

A number of embodiments of the invention have been described. Nevertheless, it will be understood that various modifications may be made without departing from the spirit and scope of the invention. Accordingly, other embodiments are within the scope of the following claims.

What is claimed is:

1. A system for enabling workflow management of a marketing campaign within a marketing organization, the marketing organization having a plurality of marketing roles defined therein, the system comprising:

a processor for processing computer instructions;

at least one display for displaying information to a respective user in response to the processor;

memory for storing computer instructions, the instructions providing for a portal layer configured to access a workbench file associated with a unique identifier of the respective user, and to determine, using the workbench file, whether the user is assigned an executive role, a marketing manager role, or a data analyst role, the portal layer further comprising:

a role portal component for providing:

a first role portal corresponding to the marketing manager role within the marketing organization, a second role portal corresponding to the data analyst role within the marketing organization, and a third role portal corresponding to the executive role within the marketing organization; and a workbench component for generating one or more workbenches on the at least one display that include color-coded status indicators scoring current marketing campaign metrics tailored to the user's role, the workbenches comprising:

a first workbench corresponding to the marketing manager role, the first workbench permitting the user to selectively access metric and workflow information associated with the marketing manager role including marketing analysis and reporting information, a second workbench corresponding to the data analyst role permitting the user to selectively access metric and workflow information associated with the data analyst role including information that determines whether a proposed marketing campaign will be successful, the metric and workflow information associated with the data analyst role being different from the metric and workflow information associated with the marketing manager role, and a third workbench corresponding to the executive role permitting the user to selectively access metric and workflow information associated with the executive role, the metric and workflow information associated with the executive role including information that tracks completed and incomplete tasks and being different from the metric and workflow information associated with the marketing manager role and the metric and workflow information associated with the data analyst role, wherein, if the user is assigned the executive role, the third workbench further comprises an executive home page further comprising:

a company scorecard region displaying high-level key company retention and financial metrics, organized according to a current value for a specified time period, a target value for the same time period, and the color-coded status indicators;

an employee scorecard region displaying overview information about employees for whom the user is responsible, including a number of employees and an attrition rate and the color-coded status indicators; and a customer scorecard region organized according to the current value, the target value, and the color-coded status indicators.

2. The system of claim 1, wherein the workbench file further comprises:

role information specifying that the user is assigned the executive role, the marketing manager role, or the data analyst role; and modifications to the one or more workbenches specified by the user.

3. The system of claim 1, wherein, for each role, the one or more workbenches further comprises:

a home page displaying top-level scorecard for marketing efforts;

an activities page displaying a listing of tasks to be completed and computer-accessible resources usable to complete the tasks;

a campaigns page displaying high-level information describing campaigns and metrics pertaining to the campaigns;

an analysis page displaying results of analysis; and an industry news page, wherein each page is tailored to the role the user serves in the marketing organization.

4. The system of claim 3, wherein the listing of tasks is displayed on the activities page and the home page.

5. The system of claim 1, wherein the portal layer is further configured to:

cause the one or more workbenches to be customized to the user's role, despite allowing the user to generally customize the one or more workbenches.

6. The system of claim 1, wherein the portal layer is further configured to:

determine information applicable to the role the user serves within the marketing organization; and display the information on the one or more workbenches.

7. The system of claim 1, wherein
the customer scorecard region further comprises:

a retention measures sub-region displaying key customer metrics in retention, acquisition and development, including a number of accounts closed over the specified time period, a percent asset retention, a percent customer retention rate, and a percent customer satisfaction, an acquisition measures sub-region displaying an average cost of acquiring a new customer, a number of customers acquired, and an average profitability measure for new customers, and a development measures sub-region displaying a total number of accounts held by each existing customer, a total number of active customer accounts, a number of customers, and revenues, costs and net income per customer; and a company news scorecard region displaying company news, news links, and research links, including stock charts and links to most recent earnings statements.

8. The system of claim 7, wherein, if the user is assigned the executive role, the third workbench further comprises an executive activities page further comprising:

a task details region displaying details regarding a specific selected task and providing an interface through which the user interacts with a non-marketing workflow application; and an online references region linking to references stored within a marketing organization's computing resources.

9. The system of claim 8, wherein, if the user is assigned the executive role, the third workbench further comprises an executive campaigns activities page further comprising:

an active campaigns region identifying current marketing campaigns and displaying high-level return-on-investment metrics for each of the identified current marketing campaigns;

a campaign history region organized according to the current value, the target value, and the color-coded status indicators, and displaying:

metrics pertaining to marketing campaigns identified in the marketing activity region, including a campaign description, a count of contacts made in the identified marketing campaigns, a response rate, and a conversion rate, and a spreadsheet column showing a percentage of contacts in which there was a purchase; and a campaign selection region for selecting campaigns by category.

10. The system of claim 9, wherein, if the user is assigned the executive role, the third workbench further comprises an executive analysis page further comprising:

a segment overview region showing customer breakdowns for a specified marketing segment;

a key metrics region displaying a total product count, products per customer, total assets, and total profitability;

a demographics region displaying metrics regarding customers organized by a customer type; and a psychographics region displaying metrics including percentages of customers who value specified activities.

11. The system of claim 1, wherein, if the user is assigned the marketing manager role, the first workbench further comprises a manager home page further comprising:

a marketing activity region organized according to a current value for a specified time period, a target value for the same time period, and the color-coded status indicators, and further comprising:

a customer retention activities sub-region displaying metrics associated with loyalty programs and retention of high-value customers, a customer development activities sub-region displaying metrics associated with programs for developing existing customers, and an acquisition activities sub-region displaying metrics associated with programs for developing new customers;

a customer scorecard region organized according to the current value, the target value, and the color-coded status indicators and comprising:

a retention measures sub-region displaying key customer metrics in retention, acquisition and development, including a number of accounts closed over the specified time period, a percent asset retention, a percent customer retention rate, and a percent customer satisfaction,
an acquisition measures sub-region displaying an average cost of acquiring a new customer, a number of customers acquired, and an average profitability measure for new customers, and
a development measures sub-region displaying a total number of accounts held by each existing customer, a total number of active customer accounts, a number of customers, and revenues, costs and net income per customer;
a company news scorecard region displaying company news, news links, and research links, including stock charts and links to most recent earnings statements; and
a tasks region displaying data derived from a non-marketing workflow application, without providing direct access to the non-marketing workflow application.

12. The system of claim 11, wherein, if the user is assigned the marketing manager role, the first workbench further comprises a manager campaigns activities page further comprising:
a campaign management application region providing access to the campaign management application;
an active campaigns region identifying current marketing campaigns and displaying high-level return-on-investment metrics for each of the identified current marketing campaigns;
a campaign history region organized according to the current value, the target value, and the color-coded status indicators, and displaying:
metrics pertaining to marketing campaigns identified in the marketing activity region, including a campaign description, a count of contacts made in the identified marketing campaigns, a response rate, and a conversion rate, and
a spreadsheet column showing a percentage of contacts in which there was a purchase; and
a campaign selection region for selecting campaigns by category.

13. The system of claim 1, wherein, if the user is assigned the data analyst role, the second workbench further comprises an analyst home page further comprising:
a marketing activity region organized according to a current value for a specified time period, a target value for the same time period, and the color-coded status indicators, and further comprising:
a customer retention activities sub-region displaying metrics associated with loyalty programs and retention of high-value customers,
a customer development activities sub-region displaying metrics associated with programs for developing existing customers, and
an acquisition activities sub-region displaying metrics associated with programs for developing new customers;
a campaign scorecard region organized according to the current value, the target value, and the color-coded status indicators, and displaying metrics pertaining to marketing campaigns identified in the marketing activity region, including a campaign description, a count of contacts made in the identified marketing campaigns, a response rate, and a conversion rate;
a company news scorecard region displaying company news, news links, and research links, including stock charts and links to most recent earnings statements; and
a tasks region displaying data derived from a non-marketing workflow application, without providing direct access to the non-marketing workflow application.

14. The system of claim 13, wherein, if the user is assigned the data analyst role, the second workbench further comprises an analyst analysis page further comprising:
an analytical modeling application region providing access to the analytical modeling application;
a marketing report region allowing the user to add a marketing report created by an outside vendor;
a segment overview region showing customer breakdowns for a specified marketing segment;
a key metrics region displaying a total product count, products per customer, total assets, and total profitability;
a demographics region displaying metrics regarding customers organized by a customer type; and
a psychographics region displaying metrics including percentages of customers who value specified activities.

15. A computer-implemented method for enabling workflow management of a marketing campaign within a marketing organization, the marketing organization having a plurality of marketing roles defined therein, the method comprising:
providing, using a processor for processing computer instructions, at least one display for displaying information to a respective user in response to the processor, and memory for storing computer instructions, a portal layer configured to access a workbench file associated with a unique identifier of the respective user, and to determine, using the workbench file, whether the user is assigned an executive role, a marketing manager role, or a data analyst role, the portal layer further comprising:
a role portal component for providing:
a first role portal corresponding to the marketing manager role within the marketing organization,
a second role portal corresponding to the data analyst role within the marketing organization, and
a third role portal corresponding to the executive role within the marketing organization; and
a workbench component for generating one or more workbenches on the at least one display that include color-coded status indicators scoring current marketing campaign metrics tailored to the user's role, the workbenches comprising:
a first workbench corresponding to the marketing manager role, the first workbench permitting the user to selectively access metric and workflow information associated with the marketing manager role including marketing analysis and reporting information,
a second workbench corresponding to the data analyst role permitting the user to selectively access metric and workflow information associated with the data analyst role including information that determines whether a proposed marketing campaign will be successful, the metric and workflow information associated with the data analyst role being different from the metric and workflow information associated with the marketing manager role, and
a third workbench corresponding to the executive role permitting the user to selectively access metric and workflow information associated with the executive role, the metric and workflow information associated with the executive role including information that tracks completed and incomplete tasks and being different from the metric and workflow information associated with the marketing manager role and the metric and workflow information associated with the data analyst role, wherein, if the user is assigned the executive role, the third workbench further comprises an executive home page further comprising:
- a company scorecard region displaying high-level key company retention and financial metrics, organized according to a current value for a specified time period, a target value for the same time period, and the color-coded status indicators;
- an employee scorecard region displaying overview information about employees for whom the user is responsible, including a number of employees and an attrition rate and the color-coded status indicators; and
- a customer scorecard region organized according to the current value, the target value, and the color-coded status indicators.

16. A computer storage medium encoded with a computer program, the program for enabling workflow management of a marketing campaign within a marketing organization, the marketing organization having a plurality of marketing roles defined therein, and the program comprising instructions that when executed by data processing apparatus cause the data processing apparatus to perform operations comprising:

providing, using a processor for processing computer instructions, at least one display for displaying information to a respective user in response to the processor, and memory for storing the computer instructions, a portal layer configured to access a workbench file associated with a unique identifier of the respective user, and to determine, using the workbench file, whether the user is assigned an executive role, a marketing manager role, or a data analyst role, the portal layer further comprising:

a role portal component for providing:
- a first role portal corresponding to the marketing manager role within the marketing organization,
- a second role portal corresponding to the data analyst role within the marketing organization, and
- a third role portal corresponding to the executive role within the marketing organization; and a workbench component for generating one or more workbenches on the at least one display that include color-coded status indicators scoring current marketing campaign metrics tailored to the user's role, the workbenches comprising:
- a first workbench corresponding to the marketing manager role, the first workbench permitting the user to selectively access metric and workflow information associated with the marketing manager role including marketing analysis and reporting information,
- a second workbench corresponding to the data analyst role permitting the user to selectively access metric and workflow information associated with the data analyst role including information that determines whether a proposed marketing campaign will be successful, the metric and workflow information associated with the data analyst role being different from the metric and workflow information associated with the marketing manager role, and
- a third workbench corresponding to the executive role permitting the user to selectively access metric and workflow information associated with the executive role, the metric and workflow information associated with the executive role including information that tracks completed and incomplete tasks and being different from the metric and workflow information associated with the marketing manager role and the metric and workflow information associated with the data analyst role, wherein, if the user is assigned the executive role, the third workbench further comprises an executive home page further comprising:
- a company scorecard region displaying high-level key company retention and financial metrics, organized according to a current value for a specified time period, a target value for the same time period, and the color-coded status indicators;
- an employee scorecard region displaying overview information about employees for whom the user is responsible, including a number of employees and an attrition rate and the color-coded status indicators; and
- a customer scorecard region organized according to the current value, the target value, and the color-coded status indicators.

* * * * *

UNITED STATES PATENT AND TRADEMARK OFFICE
CERTIFICATE OF CORRECTION

PATENT NO.        : 7,788,126 B2
APPLICATION NO.   : 11/543660
DATED             : August 31, 2010
INVENTOR(S)       : Todd R. Wagner et al.

It is certified that error appears in the above-identified patent and that said Letters Patent is hereby corrected as shown below:

In column 15, line 18, in claim 11, delete "the" and insert -- a --, therefor.

Signed and Sealed this

Twenty-first Day of December, 2010

David J. Kappos
*Director of the United States Patent and Trademark Office*